Aug. 21, 1928.
R. DOUGAN
1,681,469
LOCKING DEVICE FOR MOTOR VEHICLE TIRES AND RIMS
Filed April 4, 1927
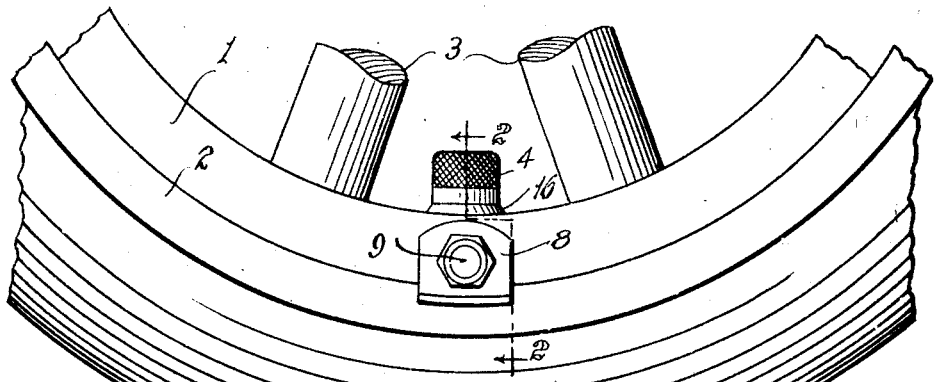
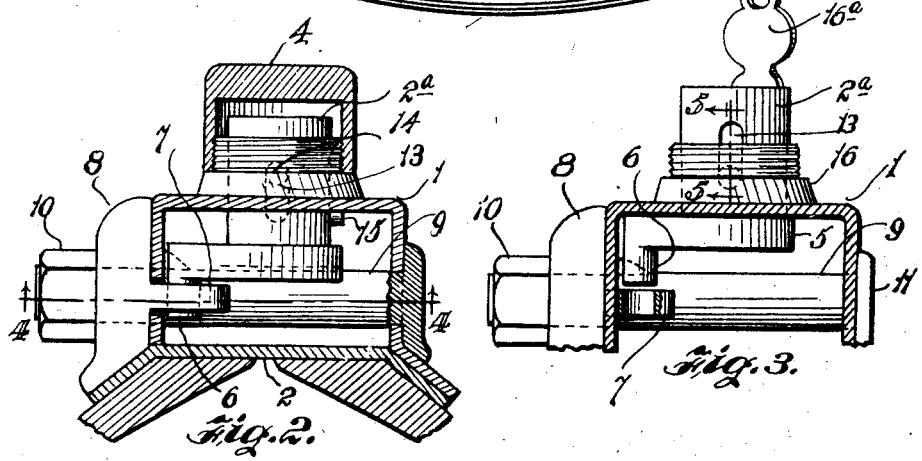
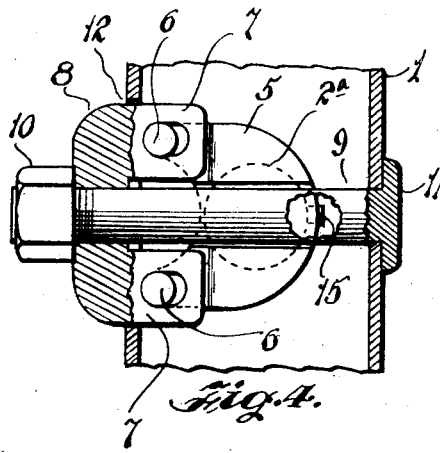
Robert Dougan
INVENTOR
BY *John M. Spellm*
ATTORNEY Patented Aug. 21, 1928.

1,681,469

UNITED STATES PATENT OFFICE.

ROBERT DOUGAN, OF DALLAS, TEXAS.

LOCKING DEVICE FOR MOTOR-VEHICLE TIRES AND RIMS.

Application filed April 4, 1927. Serial No. 180,794.

This invention relates to improvements in motor vehicle tire and rim locks to prevent theft or unauthorized removal of a tire, and one of the objects of the invention is the provision of a lock which requires no changes either in the wheel or the felloe, the lock being within the latter, but easily accessible from the outside through the operation of a key in the lock.

A further object of the invention is that the cutting of the rivets or bolts which fasten the lock to the felloe will in no wise permit the removal of the rim or tire.

With the above and further minor, yet important, objects in view, the invention will be clearly understood from a perusal of the following detailed description, in connection with the accompanying drawings forming part of this specification, and wherein:

Figure 1 is a side elevational view of a portion of a motor vehicle wheel and illustrating an embodiment of the lock.

Figure 2 is a sectional detail view, taken along the line 2—2 of Figure 1.

Figure 3 is a similar view.

Figure 4 is a sectional detail view taken along the line 4—4 of Figure 2; and

Figure 5 is also a sectional detail view taken along the line 5—5 in Figure 3.

Proceeding in accordance with the drawings and wherein similar numerals designate the various parts of the device, 1 denotes the felloe of a wheel of the artillery type to which the invention is particularly designed; and 2 represents the rim. The wheel spokes are indicated at 3.

The lock which is of cylindrical form is indicated at 2ª and a threaded collar 16 permits the reception of a screw cap 4. Formed integrally with the lock 2ª is a substantially U-shaped member 5 and formed on the points or projecting ends thereof are two lugs 6. These lugs are for the purpose of making locking engagement with two eyed lugs 7, also formed integrally with the regular rim lug 8. The rim lug 8 is perforated for the reception of a bolt 9 which traverses the felloe and includes an ordinary nut 10 and head 11. As will be apparent from the drawing, Figure 4, the felloe is cut away at 12 to form a recess for the lug 8.

Referring to Figure 3, it will be observed that the lock 2ª is grooved at 13 so that a small lug 14, formed on a collar 16, welded or otherwise affixed to the felloe—may move therein when the lock is moved into and out of locking position. The plunger of the lock is indicated at 15, the plunger being reciprocated in the lock by means of the key 16ª. The lock is specially adapted to that type of motor vehicle wheel which includes a counterbalance opposite the air inlet valve of the tube or tire.

In operation, the removal of the cap 4 from the collar 16 permits the key to be inserted in the lock, and which when turned will cause the small plunger 15 to slide within the lock body. The key is then pulled outward which will cause the lugs 6 to move out of engagement with the eyed lugs 7, as clearly shown in Figure 3. This will permit the lug 8 to be displaced, after removal of the bolt 9.

From the foregoing it will now be apparent that even when the bolt 9 is removed in an endeavor to remove the tire or rim without authority, the lock is still intact, since the lug 8 and rim 2 are still held together by the lugs 6 on the U-shaped member 5. Furthermore, the plunger 15 of the lock is entirely enclosed within the felloe 1.

What is claimed is:

1. A locking device adapted to be used for locking together a wheel felloe and its rim, comprising a rim lug located at one side of the felloe and having a portion extending laterally into and movable laterally with respect to the felloe, and a lock for securing said extension to the felloe.

2. A rim locking device for a wheel felloe comprising a lug adapted to retain the rim on the felloe, said rim lug being located at one side of the felloe and having a portion extending through the felloe, said extension being provided with a bolt receiving aperture, and a lock extending laterally into and movable laterally with respect to said aperture for securing the rim to the felloe.

3. A rim and tire locking device for motor vehicles adapted to be used with the wheel felloe and rim, comprising a lock partially seated within the felloe and adapted to be reciprocated therein in the locking and unlocking of the device; said lock having a member including spaced apart lugs, a rim lug having spaced apart and perforated ears and wherein the lugs of the spaced-apart member are engageable; and means for supporting the lock in the felloe.

4. A rim and tire locking device for motor vehicle wheels adapted to be used with the wheel felloe and rim, comprising a lock partially seated in and adapted to be moved inwardly and outwardly of the felloe in the locking and unlocking of the device; said felloe having a recess, a rim lug seated on the outside of the felloe and having ears receivable within said recess; said lock including lugs engageable in said ears; and a collar affixed to the felloe and through which the lock is seated; said collar including a projecting part and said lock having a recess within which the projecting part is adapted to slide in the locking and unlocking of the device.

5. A locking device for motor vehicle tires and rims as set out in claim 4 and wherein said ears are perforated for the reception of said lugs on the lock, wherein said lock is movable within the felloe by a key which operates the plunger of the lock, the plunger of the lock bearing against the underside of the felloe when the device is in locked position.

In testimony whereof, I affix my signature.

ROBERT DOUGAN.